United States Patent [19]
Slowbe

[11] 3,989,399
[45] Nov. 2, 1976

[54] STRUCTURAL JOINT ASSEMBLY
[76] Inventor: Joseph A. Slowbe, 3189 W. 73rd St., Cleveland, Ohio 44102
[22] Filed: Oct. 4, 1974
[21] Appl. No.: 512,340

[52] U.S. Cl. .............................. 403/245; 403/232; 403/353; 52/241; 52/721
[51] Int. Cl.² .................... B25G 3/00; F16B 9/00; F16L 41/00
[58] Field of Search .......... 403/245, 231, 232, 189, 403/353, 381, 382, 403, 406; 52/758 R, 241, 664, 665, 669, 645, 721

[56] References Cited
UNITED STATES PATENTS

| | | | |
|---|---|---|---|
| 2,966,708 | 1/1961 | Freeman | 52/758 R X |
| 3,018,862 | 1/1962 | Litteral et al. | 52/758 R |
| 3,025,122 | 3/1962 | Millman | 52/758 R X |
| 3,396,499 | 8/1968 | Biffani | 52/758 R X |
| 3,780,485 | 12/1973 | Matson | 52/665 |
| 3,798,865 | 3/1974 | Curtis | 52/665 |
| 3,837,128 | 9/1974 | O'Brien | 52/241 |

FOREIGN PATENTS OR APPLICATIONS
127,270   1/1950   Sweden ............................. 403/245

Primary Examiner—Wayne L. Shedd
Attorney, Agent, or Firm—Meyer, Tilberry & Body

[57] ABSTRACT

A structural joint assembly is provided between perpendicular beam members. One of the members includes a U-shaped channel having longitudinal ribs projecting inwardly from the sidewalls thereof, and the other member includes a plate extension on one end thereof projecting into the channel of the first member transverse to the axis thereof. The side edges of the plate are notched to receive the ribs of the first member, and the sidewalls and/or bottom wall of the channel are provided with opposed resilient tabs engaging opposite sides of the plate. The ribs and notches interengage the two members against separation, and the tabs position the second member longitudinally with respect to the first member.

24 Claims, 12 Drawing Figures

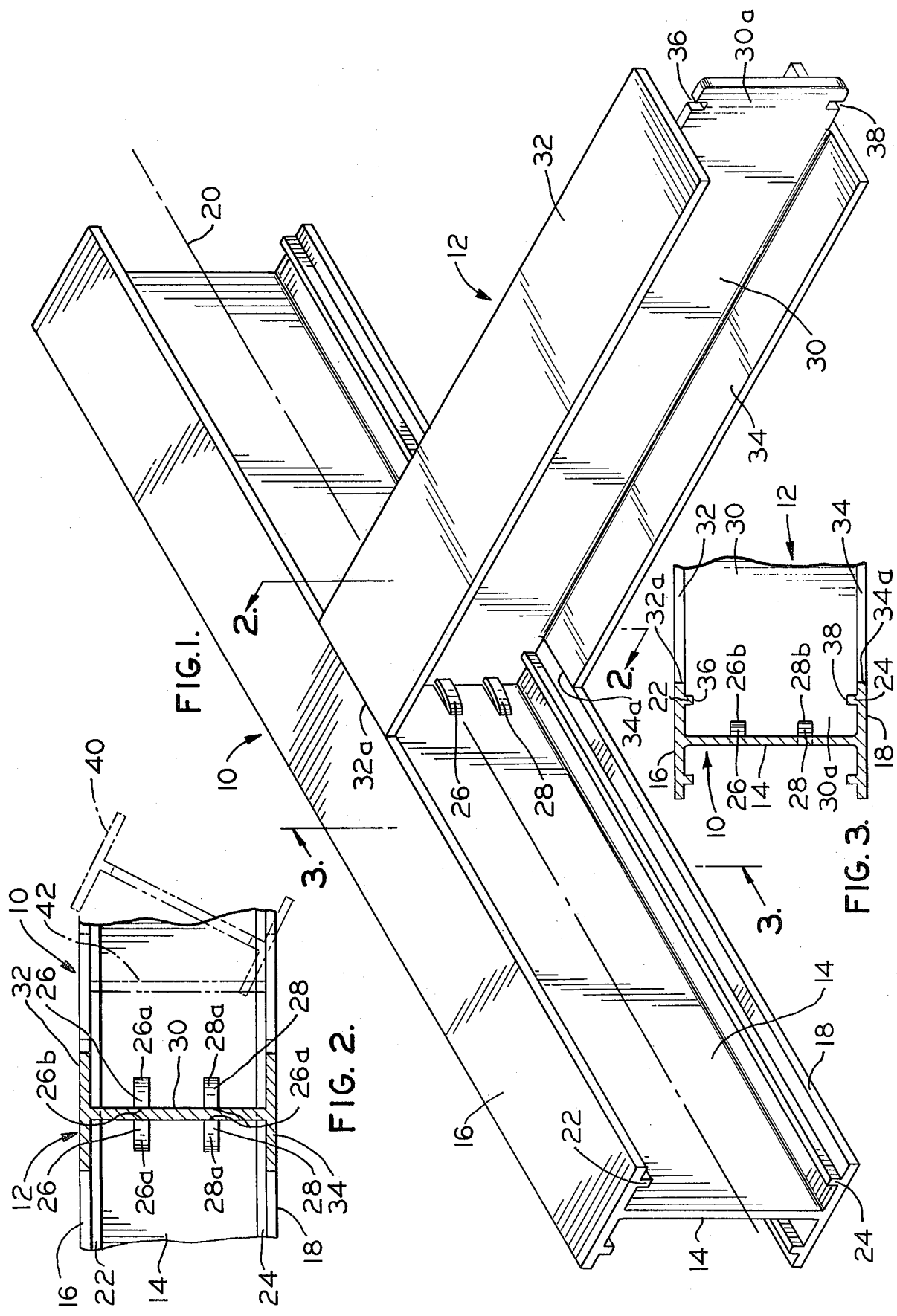

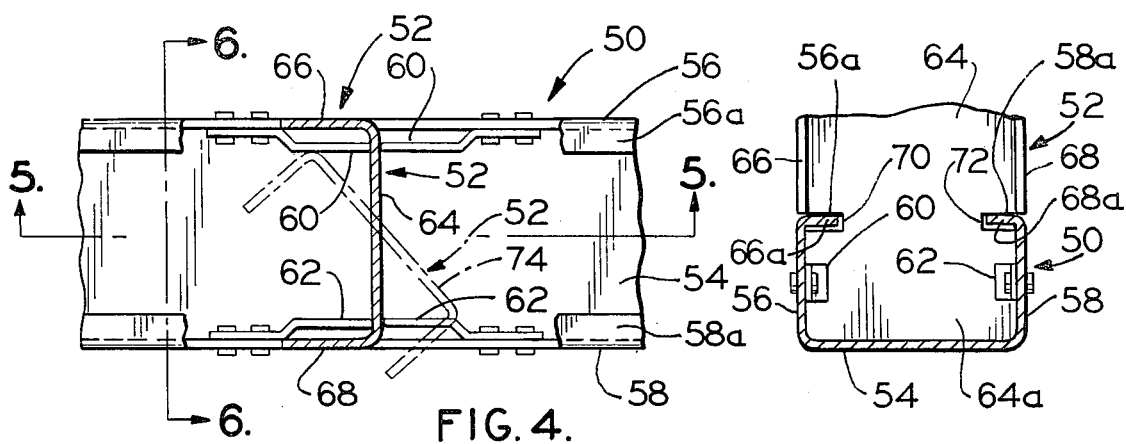
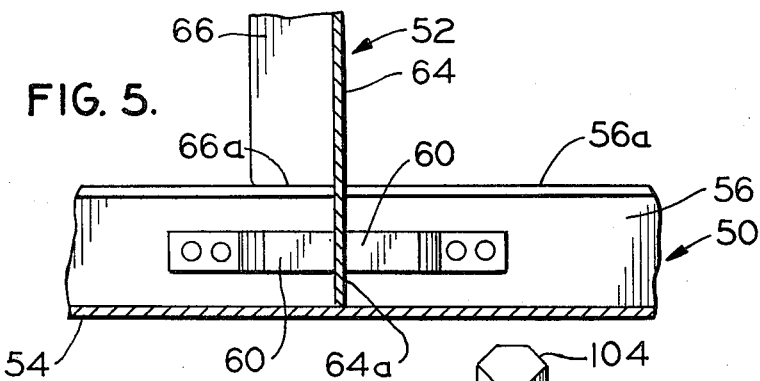
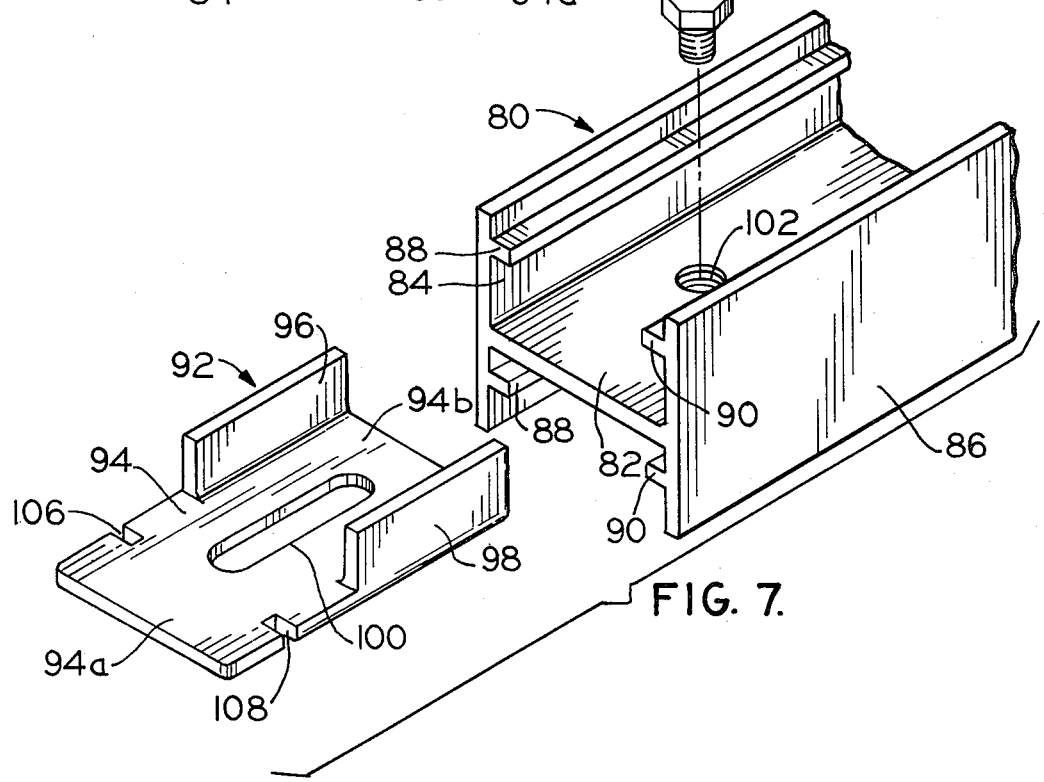

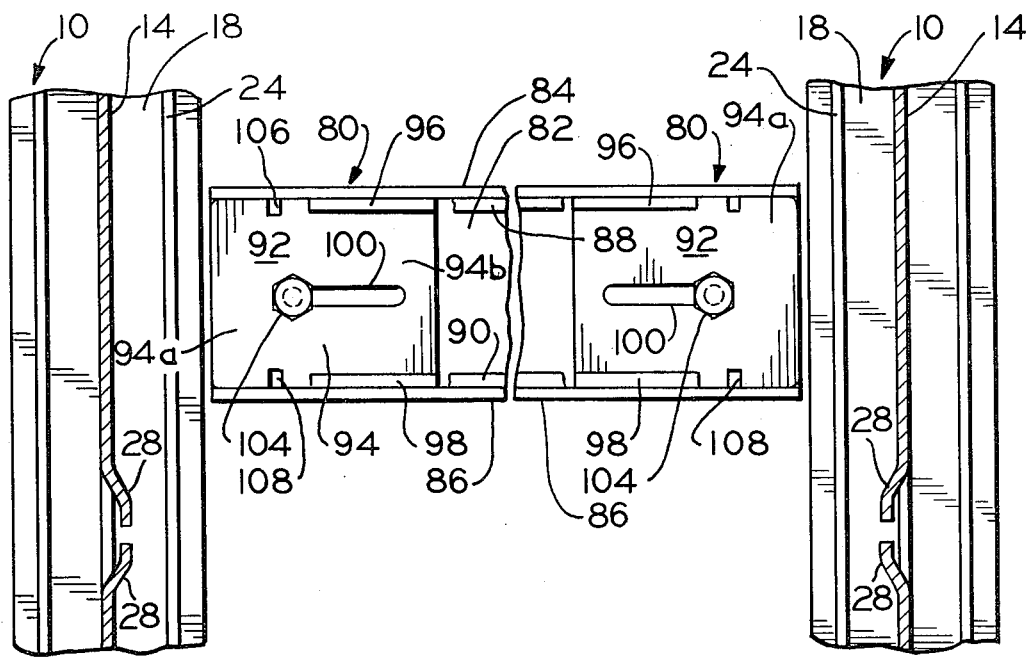
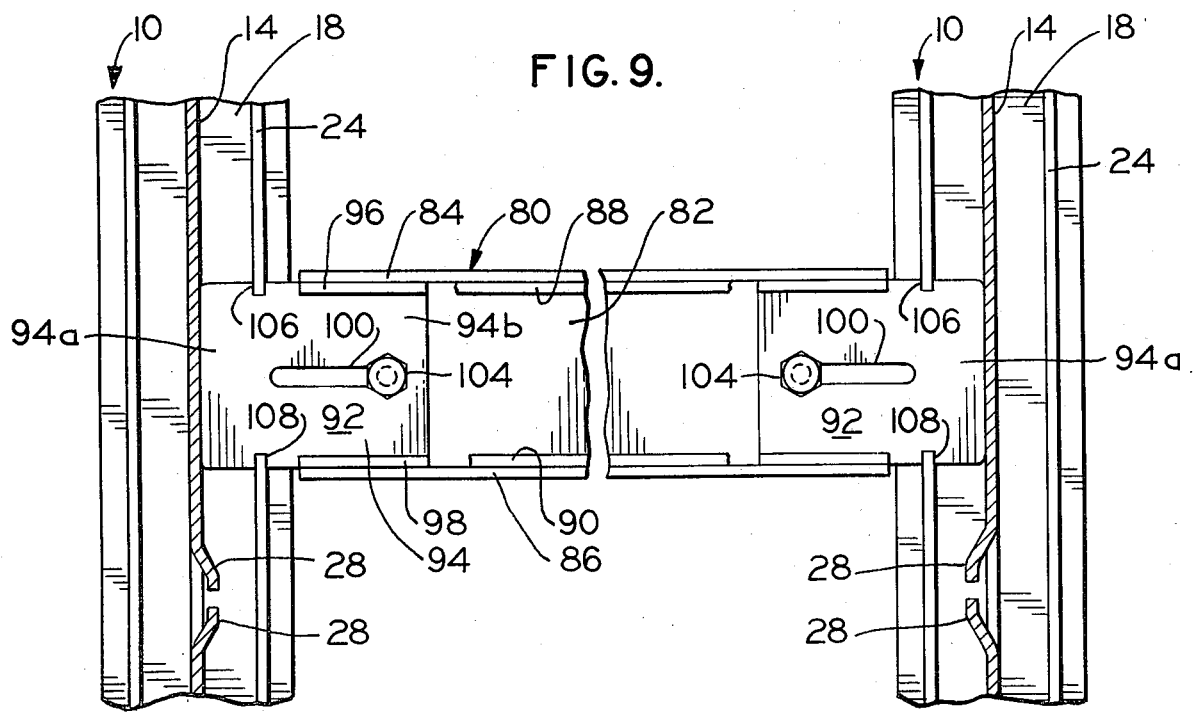

STRUCTURAL JOINT ASSEMBLY

This invention relates to the art of joint structures and, more particularly, to a structural joint between the side of a first member and the end of a second member.

In accordance with the present invention, a joint assembly between light weight structural members is provided which enables the end of one structural member to be readily snap-locked in place relative to the side of a second structural member which is in the form of or includes a channel into which the end of the one member projects. The joint assembly has general utility in connection with the construction of a wide variety of structural assemblies in which it is desirable to provide for the structural members to be quickly and easily assembled, relatively positioned and interengaged against separation once assembled, and readily separable if and when it is desired to do so. The foregoing features are desirable, for example, in constructing a frame assembly to support a panel such as a wall panel, an office partition panel, a ceiling panel, or the like. In such frame assemblies, structural members in the form of channels or I-beams are interconnected to provide a generally continuous channel peripherally of the frame and opening inwardly thereof to receive the marginal edges of panel component.

In accordance with the present invention, one of the structural members is in the form of or includes a channel having a bottom wall and side walls. The side walls are provided with inwardly projecting flanges. The second structural member includes an end portion receivable in the channel and cooperable with the channel flanges to releasably interengage the members against separation in the direction outwardly of the channel. Further, the channel and second member are cooperably interengaged against longitudinal displacement of the second member relative to the channel.

In accordance with one aspect of the present invention, the end portion of the second member has side edges notched to receive the channel flanges, and the channel is provided with longitudinally opposed pairs of resilient tabs integral with or attached thereto and adapted to receive the end portion of the second member therebetween. This arrangement provides for the end portion of the second member to be introduced into the channel at an angle with respect to the axis thereof and then twisted to interengage the notches and flanges. Such twisting can result in simultaneously interengaging the end portion of the second member with the longitudinally opposed tabs or such twisting may be followed by longitudinal sliding of the second member relative to the channel and the resilient tabs thereon to position the end portion of the second member between the tabs.

In accordance with another aspect of the invention, the end portion on the second structural member is defined by an extension plate assembly which is attached to the second member. Preferably, the extension plate assembly is longitudinally slideable relative to the second member and is adapted, when extended, to be received in the channel of the first member. The extension plate assembly is provided with notches or notch defining components cooperable with the channel flanges to interengage the second member with the channel against separation in the direction outwardly of the channel. Further, the extension plate assembly provides for the second structural member to be interengaged with the channel against displacement longitudinally thereof.

The use of an extension plate facilitates supplying the corresponding structural member in indeterminate lengths which can be cut to desired lengths in the field and then provided with an extension plate at one or both of the opposite ends thereof. This advantageously avoids cutting or otherwise finishing the ends of the one structural member during manufacture thereof, or in the field. Moreover, the use of such an extension plate facilitates construction of a structural assembly in accordance with dimensional requirements or changes encountered in the field during construction.

Still further, by providing for the extension plates to be slideable relative to the corresponding structural member, the latter member can be initially positioned between fixed components of the structure without having to cant the member in order to position the opposite ends thereof in the channels of the fixed member. In this respect, the extension plates can be initially retracted relative to the ends of the member and the latter positioned between the fixed members in the desired angular orientation relative thereto. The end plates can then be extended into the channels of the fixed members and locked in place relative to the corresponding member.

It is accordingly an outstanding object of the present invention to provide an improved structural joint between the open side of a channel member and the end of a second structural member.

A further object is the provision of a joint structure of the foregoing character in which the second structural member is releasably interengaged with the first member to longitudinally position the second member relative to the first member and to interengage the second member with the first member against separation therefrom longitudinally of the second member.

Yet a further object is the provision of a joint structure of the foregoing character which minimizes the time required to achieve assembly of the two members to provide a joint structure therebetween.

Another object is the provision of a joint structure of the foregoing character in which the positioning and interengagement against separation are achieved by components carried by the two structural members and including flanges on the first member and notches or notch defining elements on the end of the second member.

Yet another object is the provision of a joint structure of the foregoing character in which the end of a second member is removable and/or longitudinally adjustable relative to the remainder of the second member.

Yet a further object is the provision of a joint structure of the foregoing character which is economical to construct, wherein assembly is readily effected, and which has considerable structural integrity when completed.

The foregoing objects, and others, will in part be obvious and in part pointed out more fully hereinafter in conjunction with the written description of preferred embodiments of the invention illustrated in the accompanying drawing in which:

FIG. 1 is a perspective view of a joint assembly made in accordance with the present invention;

FIG. 2 is a cross-sectional elevation view taken along line 2—2 in FIG. 1;

FIG. 3 is a cross-sectional elevation view taken along line 3—3 in FIG. 1;

FIG. 4 is a plan view, partially in section, of another joint assembly made in accordance with the present invention;

FIG. 5 is a cross-sectional elevation view taken along line 5—5 in FIG. 4;

FIG. 6 is a cross-sectional elevation view taken along line 6—6 in FIG. 4;

FIG. 7 is an exploded perspective view of the components of one of the structural members in accordance with another embodiment of the invention;

FIG. 8 is an elevation view, partially in section, showing the components illustrated in FIG. 7 in partially assembled relationship between fixed structural members;

FIG. 9 is a side elevation view similar to FIG. 8 and showing the structural components in a second position thereof prior to completion of the joint assembly;

Figure 10:
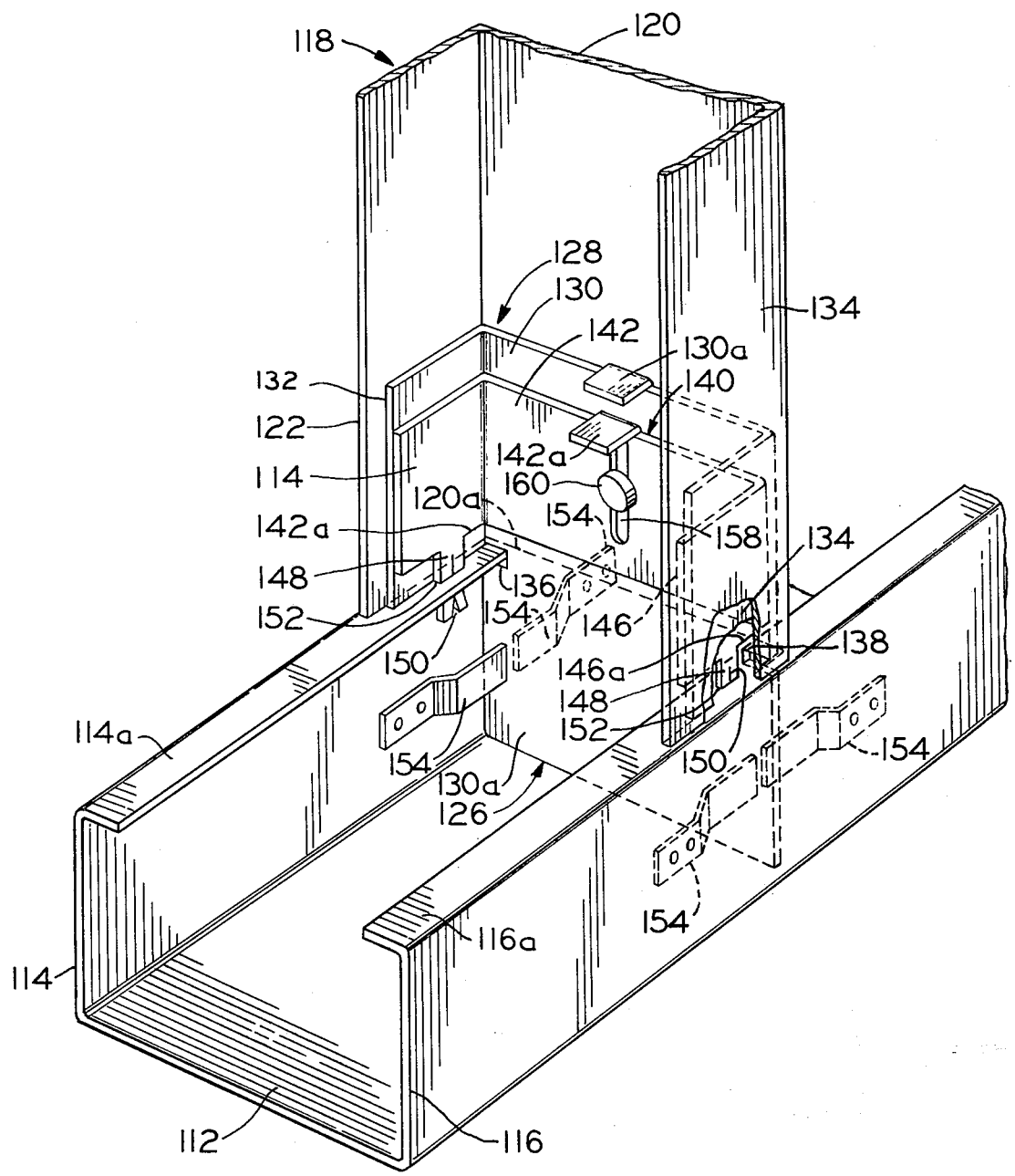
FIG. 10 is a perspective view of yet another embodiment of a joint structure made in accordance with the present invention.

Referring now in greater detail to the drawings wherein the showings are for the purpose of illustrating preferred embodiments of the invention only and not for the purpose of limiting the same, FIGS. 1–3 illustrate a joint assembly between the side of the first structural member 10 and the end of second structural member 12. Members 10 and 12 preferably are of a light weight material such as aluminum or a suitable plastic. Member 10 is an I-beam having a web 14 and a pair of flanges 16 and 18. Web 14 defines the bottom wall and flanges 16 and 18 the sidewalls of a channel having a longitudinal axis 20 and an open side facing the end of member 12. In this embodiment, flanges 16 and 18 are provided with longitudinally extending ribs 22 and 24, respectively, projecting inwardly of the channel. Ribs 22 and 24 are in opposed generally coplanar relationship and, in the embodiment shown, are slightly spaced from the outer edges of flanges 16 and 18 toward web 14.

Web 14 is provided with opposed pairs of tabs 26 and 28 which preferably are struck from the material of web 14. Accordingly, each of the tabs 26 has an end 26a integral with web 14 and tabs 28 likewise have ends 28a integral with web 14. Further, tabs 26 and 28 have corresponding opposed ends 26b and 28b longitudinally spaced apart for the purpose set forth hereinafter. Tab ends 26b and 28b extend into the channel and are spaced above the plane of the surface of web 14.

The second structural member 12 is in the form of an I-beam having a web 30 and flanges 32 and 34. I-beams 10 and 12 have the same dimension between the flanges thereof, and a portion of flanges 32 and 34 of member 12 are removed from the end of the latter member adjacent member 10. This provides flanges 32 and 34 with end edges 32a and 34a, respectively, and provides for the end 30a of web 30 to be in the form of an extension plate disposed in the channel defined by web 14 and flanges 16 and 18 of member 10. Preferably, edges 32a and 34a abut against the outer edges of the corresponding flange of member 10, and the terminal end of web extension 30a abuts against the corresponding surface of web 14 of member 10. Further, extension 30a is of a width generally corresponding to the distance between the inner surfaces of flanges 16 and 18 of member 10. The opposite side edges of end portion 30a of web 30 are provided with notches 36 and 38 respectively receiving longitudinal ribs 22 and 24 on member 10. Moreover, ends 26b and 28b of tabs 26 and 28 are longitudinally spaced apart to receive end 30a of web 30 therebetween when the components are in assembled relationship.

Assembly of members 10 and 12 is achieved as follows. End 30a is introduced into the channel of member 10 at a location spaced to one side of tabs 26 and 28 with the plane of web 30 at an angle to the channel as shown by broken lines 40 in FIG. 2. This provides for end 30a to pass ribs 22 and 24. When web end 30a abuts web 14 of member 10, notches 36 and 38 are in alignment with ribs 22 and 24. Member 12 is then twisted to the position illustrated by broken lines 42 in FIG. 2 for ribs 22 and 24 to enter notches 36 and 38. Member 12 is then displaced relative to member 10 from the broken line position 42 to the assembled position in which web end 30a is disposed between tabs 26 and 28. In so displacing member 12, it will be appreciated that the right hand tabs 26 and 28 are depressed toward web 14 until web end 30a passes the corresponding ends 26b and 28b. At this time, the latter ends spring outwardly into the channel and web end 30a is captured between the opposed pairs of tabs. Accordingly, the tabs position member 12 longitudinally of member 10 and the bottom edges of the notches define shoulders underlying the ribs to prevent displacement of member 12 outwardly of the open side of the channel member 10. Members 10 and 12 can be readily disassembled by depressing a pair of the tabs 26 and 28 on one side of web end 30a, sliding member 12 longitudinally of member 10 to a position such as that illustrated by broken line 42 in FIG. 2, and then twisting member 12 to achieve disengagement between ribs 22 and 24 and notches 36 and 38 to free member 12 for withdrawal from the channel.

A second embodiment of a joint assembly made in accordance with the present invention is illustrated in FIGS. 4–6 of the drawing. In this embodiment, the first member is in the form of a U-shaped sheet metal channel 50 and the second member is in the form of a U-shaped channel 52. Channel 50 includes a bottom wall 54 and sidewalls 56 and 58 extending along the opposite side edges of the bottom wall. Sidewalls 56 and 58 terminate at their upper edges in longitudinally extending inwardly projecting flanges 56a and 58a, respectively. Sidewall 56 is provided with an opposed pair of spring metal tabs 60, and sidewall 58 is provided with an opposed pair of similar spring metal tabs 62. Tabs 60 and 62 preferably are defined by spring metal plates having first ends riveted or otherwise attached to the corresponding sidewall and opposed second ends longitudinally spaced apart and displaced inwardly of the channel from the plane of the corresponding sidewall.

Channel member 52 includes a bottom wall 64 and sidewalls 66 and 68 extending along the opposite side edges of bottom wall 64. The ends of sidewalls 66 and 68 adjacent member 50 are cut-off to provide end edges 66a and 68a overlying sidewall flanges 56a and 58a of member 50, and to provide for the end of bottom wall 64 to be in the form of an extension plate 64a disposed within channel member 50. The inner end of extension plate 64a terminates at bottom wall 54 of member 50 and the side edges of plate 64a are provided with notches 70 and 72 adapted to receive flanges 56a and 58a, respectively. Plate 64a of a width generally corresponding to the distance between the inner surfaces of walls 56 and 58 of member 50.

Assembly of members 50 and 52 in the embodiment of FIGS. 4–6 is as follows. Extension plate 64a of member 52 is introduced into the channel member 50 between and diagonally of tabs 60 and 62 as shown by broken line 74 in FIG. 4. This positions notches 70 and 72 in alignment with flanges 56a and 58a, and member 52 is then twisted relative to member 50 to snaplock plate 64a in position between the opposed pairs of tabs 60 and 62 and to position flanges 56a and 58a in the corresponding recess in plate 64a. It will be appreciated that the free ends of spring tabs 60 and 62 are of a length to accommodate the diagonal positioning and twisting motion by which such interengagement is achieved. When so assembled, tabs 60 and 62 longitudinally position member 52 relative to member 50, and flanges 56a and 58a interengage notches 70 and 72 to hold member 52 against separation from member 50 outwardly with respect to the open side of the channel.

A modification of the extension plate structure for the end of the second member inserted into the channel of the first member is illustrated in FIG. 7 of the drawing. More particularly, components are shown in FIG. 7 of the drawing, which when assembled, provide a structural member corresponding to members 12 and 52 in the assemblies described hereinabove. The components shown in FIG. 7 include an I-beam 80 having a web 82, flanges 84 and 86 extending along the opposite sides of the web, and longitudinally extending ribs 88 and 90 projecting inwardly of the flanges. The assembly further includes an extension plate member 92 which is interengageable with the end of member 80. Extension plate 92 includes a bottom wall 94 having an outer end 94a and an inner end 94b. End 94b is provided with flanges 96 and 98 extending upwardly along the opposite sides of bottom wall 94.

The inner end of extension plate 92 is adapted to be received in the end of member 80 and conforms with the contour of the latter member as defined by web 82, the upper portions of flanges 84 and 86 and the corresponding ribs 88 and 90. Bottom wall 94 is provided with a longitudinally extending slot 100 therethrough, and web 82 of member 80 is provided with an aperture 102 which may be threaded to receive the threaded shank of headed fastener 104. When plate member 92 is disposed in the end of member 80, fastener 104 extends through slot 100 and into threaded engagement with aperture 102. Accordingly, plate member 92 is longitudinally slideable relative to member 80 and is adapted to be locked in a desired position relative thereto by means of fastener 104. Outer end 94a of plate member 92 is provided with notches 106 and 108 in the opposite side edges thereof similar to and for the purpose described hereinabove in connection with notches 36 and 38 of the embodiment illustrated in FIGS. 1–3.

As shown in FIGS. 8 and 9, the assembly of FIG. 7 is used to advantage in constructing a joint between a member 80 and a pair of structural components fixed in spaced apart relationship and including channels opening toward one another. The latter structural components may, for example, be I-beams similar to structural member 10 described hereinabove in connection with the embodiment of FIGS. 1–3. Accordingly, in FIGS. 8 and 9 the fixed structural components are depicted as I-beams of the structure shown in FIGS. 1–3, and like numerals are employed in FIGS. 8 and 9 with regard to the structure thereof.

As seen in FIGS. 8 and 9, the opposite ends of member 80 are provided with extension plates 92. Initially, fasteners 104 are loosened so that plates 92 can be retracted into the corresponding end of member 80. This facilitates moving member 80 into position between fixed structural member 10 as shown in FIG. 8. With member 80 so positioned, extension plates 92 are moved to the extended positions thereof for ends 94a to enter the corresponding channel of members 10 in an orientation which enables ends 94a to pass ribs 22 and 24 of member 10 as described hereinabove with regard to the embodiment of FIGS. 1–3. This positions notches 106 and 108 in alignment with ribs 22 and 24, and member 80 is then twisted for the planes of ends 94a to extend transverse to the axes of the channels of members 10. This twisting provides for ribs 22 and 24 to be received in notches 106 and 108 of extension plates 92. The opposite ends of channel member 80 are then displaced longitudinally of the corresponding structural member 10 to move end portions 94a of the plates into snap-locked engagement between tabs 26 and 28 of the corresponding structural member 10. Fasteners 104 are then tightened to complete the joint assembly.

While it is preferred to provide for extension plate members 92 to be longitudinally slideable relative to member 80, it will be appreciated that the extension plates could be provided with an aperture as opposed to a longitudinal slot. Such an aperture would be aligned with aperture 102 in member 80 when the plate member is in the extended position thereof. Moreover, while fastener 104 is described as being threaded by engagement with web 82, the fastener can, for example, be a rivet interengaging the extension plate and web for relative longitudinal displacement therebetween. Moreover, while flanges 96 and 98 stabilize the extension plate relative to member 80, it will be appreciated that these flanges are not necessary and can be omitted if desired as can the ribs 88 and 90 of member 80.

Referring now to FIG. 10 of the drawing, there is illustrated a further embodiment of a joint structure made in accordance with the present invention. In this respect, the first structural member 110 is a sheet metal channel member having a bottom wall 112 and side walls 114 and 116 extending upwardly from the bottom wall and terminating in inwardly directed flanges 114a and 116a respectively. The second structural member 118 is in the form of a sheet metal channel having a bottom wall 120 and side walls 122 and 124. The end of member 118 to be interengaged with member 110 is provided with an extension plate assembly 126. The extension plate assembly includes a first sheet metal member 128 having a bottom wall 130 overlying channel wall 120, and side walls 132 and 134 respectively overlying the inner surface of side walls 122 and 124 of member 118. Side walls 132 and 134 of plate member 128 have bottom edges 132a and 134a overlying flanges 114a and 116a of member 110, and bottom wall 130 has an extension portion 130a received in channel member 110. Extension portion 130a has notches 136 and 138 in the opposite side edges thereof to receive channel flanges 114a and 116a, respectively.

Extension plate assembly 126 further includes a second plate member 140 including a bottom wall 142 overlying bottom wall 130 of plate member 128, and side walls 144 and 146 respectively overlying the inner surfaces of side walls 132 and 134 of plate member 128. Side walls 144 and 146 of plate member 140 have bottom edges 144a and 146a overlying flanges 114a and 116a of member 110, and the bottom edges are provided with corresponding projections 148 having a slit or notch 150 therein for the purpose set forth hereinafter. Flanges 114a and 116a of member 110 are provided with openings 152 therethrough to receive the corresponding projections 148.

Side walls 114 and 116 of member 110 are provided with opposed pairs of tabs 154 which receive the side edges of plate extension 130a therebetween. In the embodiment shown, tabs 154 are spring fingers riveted or otherwise attached to walls 114 and 116 and corresponding structurally to spring fingers 60 shown in FIGS. 4–6.

Plate members 128 and 140 are longitudinally slideable relative to one another and to bottom wall 120 of channel member 118. For this purpose, bottom walls 130 and 142 of plate members 128 and 140 are provided respectively with aligned slots 156 and 158 therethrough, and a headed fastener 160 extends through the latter slots and is suitably interengaged with bottom wall 120 of member 118 at a location above the bottom edge 120a thereof. Fastener 160 can be threadedly interengaged with bottom wall 120 of member 118 or, alternatively, can be in the form of a rivet extending through an opening therefor in bottom wall 120 and having a head engaging the outer surface of the latter wall, whereby plate members 128 and 142 are longitudinally slideable relative to member 118 and are interengaged therewith against separation outwardly with respect to bottom wall 120. Walls 130 and 142 of plate members 128 and 140 can be provided with corresponding tabs 130a and 142a to facilitate displacement thereof relative to member 118.

To achieve assembly of the structural members shown in FIG. 10, plate member 140 is withdrawn longitudinally into channel member 118, and plate member 128 is displaced for extension portion 130a to project from end edge 120a of member 118. Member 118 is then positioned with plate portion 130a at an angle to the axis of channel member 110 and the latter plate portion is inserted into the channel member. Member 118 is then twisted to the position shown in FIG. 10, whereby notches 136 and 138 receive flanges 114a and 116a of member 110 and fingers 154 receive plate portion 130a therebetween. Plate member 140 is then displaced downwardly for projections 148 to extend into the corresponding opening 152 in the flanges of member 110. When the plates are so positioned, the lower edges of notches 136 and 138 define shoulders underlying flanges 114a and 116a to prevent displacement of member 118 in the direction outwardly of channel member 110. Further, spring fingers 154 capture plate portion 130a to restrain longitudinal displacement, and projections 148 engage openings 152 to supplement the holding function of fingers 154. Notches or slits 150 in projections 148 advantageously provide for the lower ends of the projections to be longitudinally spread into tight engagement with the longitudinally opposite ends of openings 152, thus to minimize any free play of member 118 relative to member 110. It will be appreciated that the function of plate member 142 and projection 148 can be used in connection with a structural member having an integral extension plate portion, such as plate portion 30a shown in FIGS. 1–3 and plate portion 64a shown in FIGS. 4–6.

Figure 11:
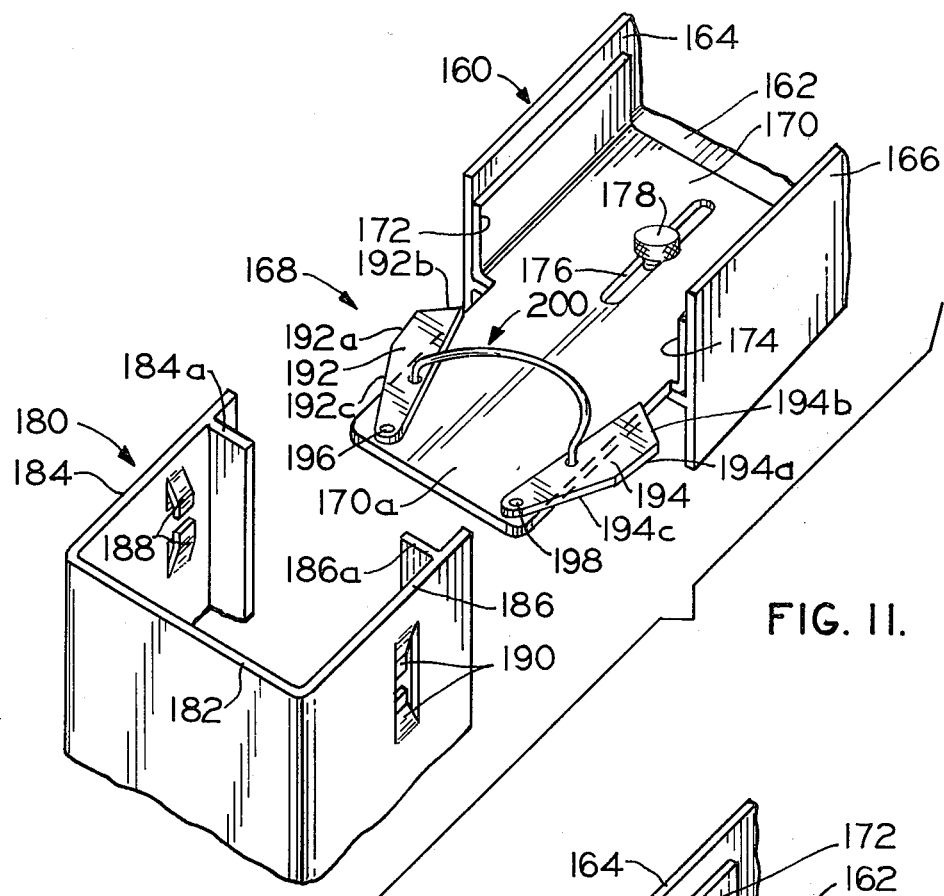
FIG. 11 is a perspective view of the components of still another embodiment of a joint structure within the present invention.

Another embodiment of an extension plate assembly for a joint construction made in accordance with the present invention is illustrated in FIG. 11 of the drawing. In this embodiment, the second structural member of a joint assembly is illustrated as being in the form of an I-beam 160 having a web 162 and flanges 164 and 166. An extension plate assembly 168 is associated with member 160 for longitudinal displacement relative to the end thereof and is in the form of a channel member having a bottom wall 170 overlying web 162 and side walls 172 and 174 overlying the inner surface of the corresponding portions of flanges 164 and 166. Bottom wall 170 is provided with a longitudinally extending slot 176, and a fastener component extends through slot 76 and is interconnected with web 162 such that extension plate 168 is longitudinally slideable into and out of the end of member 160.

In the embodiment shown in FIG. 11, the second structural member is adapted to be realeasably interengaged with a first structural member which is shown in the form of a U-shaped channel 180 having a bottom wall 182 and side walls 184 and 186. Side walls 184 and 186 are provided with inwardly projecting flanges 184a and 186a, respectively, and with longitudinally spaced apart opposed pairs of tabs 188 and 190. The latter tabs can be integral with the channel side walls as shown, or can be separate therefrom and suitably attached thereto. Moreover, as will become apparent hereinafter it is not necessary in this embodiment that the tabs be resilient and displaceable relative to the walls.

Bottom wall 170 of extension plate assembly 168 includes an extension plate portion 170a adapted to be received in channel member 180. Plate portion 170a supports a pair of fingers 192 and 194. Finger 192 is pivotally attached to plate portion 170a by means of a pivot pin 196, and finger 194 is similarly attached to plate portion 170a for pivotal movement relative thereto by means of a pivot pin 198. Pivot pins 196 and 198 are disposed adjacent the outermost end of of plate portion 170a and adjacent the opposite sides thereof, and the pins are perpendicular to the plane of plate portion 170a, whereby the fingers are pivotal laterally inwardly and outwardly relative to the plate portion. An arcurate wire spring 200 has its opposite ends suitably interengaged with fingers 192 and 194 and serves to maintain the fingers in a predetermined laterally spaced orientation relative to one another.

Fingers 192 and 194 have corresponding lateral side edges 192a and 194a and corresponding end edges 192b and 194b facing the end of member 160. Further, plate portion 170a has a lateral dimension no greater than the lateral distance between flanges 184a and 186a of channel member 180. Edges 192a and 192b of finger 192 and edges 194a and 194b of finger 194 normally extend laterally outwardly of the corresponding lateral side edge of plate portion 170a. Fingers 192 and 194 further include lateral side edges 192c and 194c extending downwardly and inwardly from edges 192a and 194a, respectively, to provide cam edges by which the fingers are displaced during assembly, as set forth below.

Structural members 160 and 180 are adapted to be interengaged by positioning extension plate assembly 168 in the extended position thereof relative to member 160, and then pushing the extension plate assembly into channel member 180 with plate portion 170a transverse to the axis of member 180. During such movement, edges 192c and 194c of the fingers engage channel flanges 184a and 186a, respectively, whereby the fingers are cammed inwardly of plate portion 170a. When the upper edges 192b and 194b of the fingers pass beneath flanges 184a and 186a, the fingers are biased outwardly by spring 200 to engage beneath the channel flanges as shown by broken lines in FIG. 11. Moreover, by initially aligning fingers 192 and 194 with the corresponding tabs 188 and 190 on channel walls 184 and 186, edges 192a and 194a of the fingers enter the space between the corresponding pair of tabs, whereby members 160 and 180 are interengaged without requiring any further displacement of member 160 relative to member 180. However, it will be appreciated that extension plate assembly 168 can be introduced into the channel of member 180 to one side or the other of the tabs and then displaced longitudinally of member 180 to achieve displacment of fingers 192 and 194 into the space between the corresponding tabs. Upper edges 192b and 194b of the fingers define shoulders underlying flanges 184a and 186a of member 180 to restrain separation of member 160 from channel member 180 in the direction outwardly of the channel.

Figure 12:
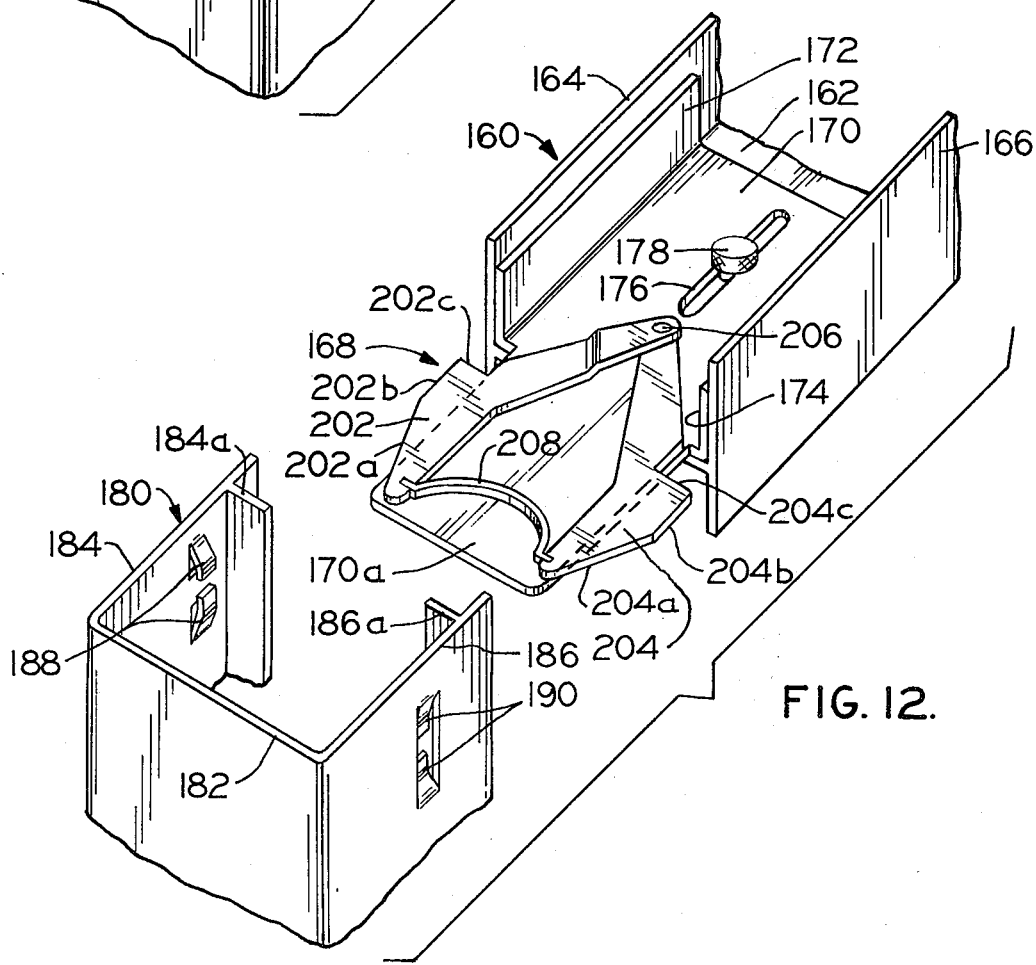
FIG. 12 is a perspective view of the components of a further embodiment of a joint structure according to the present invention.

FIG. 12 illustrates a modification of the spring finger structure of the extension plate assembly shown in FIG. 11. Accordingly, like numerals are employed in FIG. 12 to designate components identical to those shown in FIG. 11. In FIG. 12, spring fingers 202 and 204 are pivotally mounted on bottom wall 170 of the extension plate assembly by means of a common pivot pin 206 located laterally centrally of bottom wall 170 and longitudinally inwardly of plate extension portion 170a. Each finger 202 and 204 has an end opposite pin 206 disposed adjacent the outer end edge of plate portion 170a. Further, each finger is provided with a corresponding camming edge 202a and 204a, side edges 202b and 204b extending generally parallel to the side edges of plate portion 170a and spaced laterally outwardly therefrom, and inner end edges 202c and 204c extending inwardly from the corresponding side edge toward plate portion 170a. An arcuate leaf spring member 208 has its opposite ends suitably interconnected with fingers 202 and 204 to maintain the latter in a predetermined relatively spread disposition.

Assembly of members 160 and 180 in the embodiment of FIG. 12 is similar to that described hereinabove in connection with FIG. 11. In this respect, displacement of extension plate assembly 168 into channel member 180 results in engagement of finger edges 202a and 204a with flanges 184a and 186a of member 180, whereby fingers 202 and 204 are displaced laterally inwardly relative to plate portion 170a against the bias of spring 208. When finger edges 202c and 204c pass beneath flanges 184a and 186a spring 208 biases the fingers laterally outwardly whereby the latter edges engage beneath the channel flanges and finger edges 202b and 204b are received between the corresponding tabs 188 and 190.

It will be appreciated that the structural members in the embodiments of FIGS. 11 and 12 are readily separable by displacing the spring fingers laterally inwardly relative to the extension plate portion and then withdrawing member 160 from channel member 180. Moreover, it will be appreciated that the spring finger arrangements shown in FIGS. 11 and 12 can be employed in connection with an end plate extension integral with the corresponding structural member, such as plate portions 30a and 64a of the embodiments of FIGS. 1–3 and 4–6, respectively. In connection with such a modification, plate portions 30a and 64a would be narrowed laterally to a dimension no greater than the distance between the channel flanges on the member into which the plate extends.

The cross-sectional dimensions of the structural components herein shown will of course vary depending on the end use of the constructed assembly. The joint assemblies find particular utility in connection with constructing frames for wall panels or the like whereby, for example, the channels of the structural members might have a width of about 1 to 2 inches and a depth of about 1 to 1½ inches. When the structural members form intersecting channels, such as provided by the I-beams illustrated in FIGS. 1–3, a frame of such members provides a continuous channel adapted to receive the peripheral edges of a wall panel or the like. In such a frame structure, the longitudinal flanges projecting inwardly of the channel from the opposite sidewalls thereof advantageously provide for interlocking the panel edges relative to the corresponding structural member. Many frame structure designs can be constructed using the joint assembly of the present invention and, while the structural components are illustrated as being disposed at right angles to one another, it will be appreciated that the angular relationship between the structural members can be readily varied.

It will be seen from the embodiments of the present invention herein illustrated and described that a joint assembly is provided which facilitates readily interconnecting a pair of structural members in end to side relationship. Most often, the structural members will be of a light weight metal such as extended aluminum, or of sheet metal construction; however, it is contemplated that the structural components could be produced from suitable plastic material depending on the end use of the assembly constructed therefrom. Further, while the second member of the assemblies herein illustrated and described are shown as being an I-beam or U-shaped channel component, it will be appreciated that the second member could be of cross-sectional configuration other than those illustrated. In this respect, for example, the second member could be a square or rectangular tube and one wall of the tube could extend or be provided with a plate assembly adapted to extend longitudinally beyond the other walls to define the end extension received in the channel of the first member. Still further, it will be appreciated that the opposed tabs could be provided other than in opposed pairs on the bottom wall or sidewalls of the channel as shown herein. In this respect, for example, two of the tabs could be provided in the sidewalls facing in a common direction and a third tab could be provided on the bottom wall facing in the opposite direction so that the end of the second member would be received between the opposed tabs. Moreover, where spring biased locking fingers are employed in connection with the extension plate assembly, it will be appreciated that the tabs could be provided on the bottom wall of the channel member to receive the free end of the plate portion on which the fingers are mounted. Further, while the flanges or ribs on the channel member are shown as being longitudinally coextensive with the channel side walls, it will be appreciated that the desired interengagement achieved therewith can be obtained with longitudinally short flanges positioned to be received in the notches or to interengage with the spring fingers of the extension plate assemblies.

As many possible embodiments of the present invention can be made and as many possible changes can be made in the embodiments herein illustrated and described, it is to be distinctly understood that the foregoing descriptive matter is to be interpreted merely as illustrative of the present invention and not as a limitation.

What is claimed is:

1. A structural joint assembly comprising, a first member including wall means defining a channel having a longitudinal axis and an open side, a second member having end means and a longitudinal axis at an angle with respect to said channel axis, said end means including plate means in said channel and having opposite sides in the direction of siad channel axis, at least one pair of resilient tabs on said wall means, said tabs having first ends fixed with respect to said wall means and second ends within said channel spaced apart in said direction and receiving said opposite sides of said plate means therebetween to restrain displacement of said second member longitudinally of said first member, at least one tab of said pair of resilient tabs being inclined for the first and second ends of said one tab to be spaced apart in the direction of said channel axis, and said one tab being displaceable laterally of said channel axis by said plate means of said second member to permit movement of said plate means longitudinally of said channel into position between said second ends of said pair of tabs, and means interengaging said plate means and wall means against separation of said members in the direction outwardly of said open side.

2. The joint assembly according to claim 1, wherein the tabs of said one pair are struck from the material of said wall means.

3. The joint assembly according to claim 1, wherein the tabs of said one pair are spring metal fingers mounted on the said wall means.

4. The joint assembly according to claim 1, wherein said wall means of said first member includes a bottom wall opposed side walls extending along the side edges of said bottom wall and flange means on said side walls projecting inwardly of said channel, said plate means having opposite side edges adjacent said side walls and including notch means receiving said flange means, said notch means and flange means defining said means interengaging said plate means and wall means.

5. The joint assembly according to claim 4, wherein said second member includes a bottom wall and side walls extending along the side edges thereof, said plate means being integral with said bottom wall of said second member, said side walls of said second member having end edges outwardly of and facing said open side of said channel.

6. A structural joint assembly comprising, a first member including wall means defining a channel having a longitudinal axis and an open side, a second member having end means and a longitudinal axis at an angle with respect to said channel axis, said end means including plate means in said channel and having opposite sides in the direction of said channel axis, at least one pair of resilient tabs on said wall means, said tabs having first ends fixed with respect to said wall means and second ends within said channel spaced apart in said direction and receiving said opposite sides of said plate means therebetween to restrain displacement of said second member longitudinally of said first member, means interengaging said plate means and wall means against separation of said members in the direction outwardly of said open side, said wall means of said first member including a bottom wall opposed side walls extending along the side edges of said bottom wall and flange means on said side walls projecting inwardly of said channel, said plate means having opposite side edges adjacent said side walls and including notch means receiving said flange means, said notch means and flange means defining said means interengaging said plate means and wall means, said second member including a bottom wall and side walls extending along the side edges thereof, said plate means being integral with said bottom wall of said second member, said side walls of said second member having end edges outwardly of and facing said open side of said channel, the tabs of said one pair being on one of said opposed side walls of said first member, and a second pair of tabs on the other of said side walls of said first member, said one and second pair of tabs being located between said flange means and bottom wall of said first member.

7. A structural joint assembly comprising, a first member including wall means defining a channel having a longitudinal axis and an open side, a second member having end means and a longitudinal axis at an angle with respect to said channel axis, said end means including plate means in said channel and having opposite sides in the direction of said channel axis, at least one pair of resilient tabs on said wall means, said tabs having first ends fixed with respect to said wall means and second ends within said channel spaced apart in said direction and receiving said opposite sides of siad plate means therebetween to restrain displacement of said second member longitudinally of said first member, means interengaging said plate means and wall means against separation of said members in the direction outwardly of said open side, said wall means of said first member including a bottom wall opposed side walls extending along the side edges of said bottom wall and flange means on said side walls projecting inwardly of said channel, said plate means having opposite side edges adjacent said side walls and including notch means receiving said flange means, said notch means and flange means defining said means interengaging said plate means and wall means, said second member including a bottom wall and side walls extending along the side edges thereof, said bottom and side walls of said second member having corresponding end edges outwardly of and facing said open side of said channel, said plate means including a plate component having a portion in said channel and a mounting portion overlying said bottom wall of said second member, and means interengaging the latter bottom wall and mounting portion.

8. The joint assembly according to claim 7, wherein said mounting portion includes side portions each overlying a corresponding one of said side walls of said second member.

9. The joint assembly according to claim 7, wherein said means interengaging said bottom wall of said second member and said mounting portion includes means supporting said plate component for sliding movement longitudinally of said second member.

10. The joint assembly according to claim 1, wherein said wall means of said first member includes a bottom wall opposed side walls extending along the side edges of said bottom wall and flange means on each of said side walls projecting inwardly of said channel, said plate means including means underlying each of said flanges means for engagement therewith, said flange means and said underlying means together defining said means interengaging said plate means and wall means.

11. A structural joint assembly comprising, a first member including wall means defining a channel having a longitudinal axis and an open side, a second member having end means and a longitudinal axis at an angle with respect to said channel axis, said end means including plate means in said channel and having opposite sides in the direction of said channel axis, at least one pair of resilient tabs on said wall means, said tabs having first ends fixed with respect to said wall means and second ends within said channel spaced apart in said direction and receiving said opposite sides of said plate means therebetween to restrain displacement of said second member longitudinally of said first member, and means interengaging said plate means and wall means against separation of said members in the direction outwardly of said open side, said wall means of said first member including a bottom wall opposed side walls extending along the side edges of said bottom wall and flange means on each of said side walls projecting inwardly of said channel, said plate means including means underlying each of said flange means for engagement therewith, said flange means and said underlying means together defining said means interengaging said plate means and wall means, said plate means having side edges adjacent said flange means, and said underlying means being a pair of fingers each mounted on said plate means for pivotal movement laterally inwardly and outwardly of a corresponding one of said side edges.

12. The joint assembly according to claim 11, and spring means biasing said fingers laterally outwardly of the corresponding side edge.

13. The joint assembly according to claim 11, wherein said second member includes a bottom wall and side walls extending along the side edges thereof, said bottom and side walls of said second member having end edges outwardly of and facing said open side of said channel, said plate means including a plate component having a portion in said channel and a mounting portion overlying said bottom wall of said second member, and means interengaging said mounting portion with said bottom wall for said plate means to be slideable longitudinally of said second member.

14. The joint assembly according to claim 11, wherein said one pair of resilient tabs are on one of said side walls of said first member, a second pair of said resilient tabs on the other of said side walls, said fingers each having a lateral outer edge received between the second ends of the pair of tabs on the corresponding sidewall.

15. A structural joint assembly comprising, a first member including wall means defining a U-shaped channel having a bottom wall, side walls and flange means extending inwardly of the channel from said side walls, a second member having end means and a longitudinal axis at an angle with respect to the longitudinal axis of said channel, said end means including plate means in said channel and having opposite sides in the direction of said channel axis, displaceable finger means on said plate means underlying each of said flange means to restrain displacement of said end means from said channel longitudinally of said second member, said finger means being displaceable laterally inwardly of said channel to release said end means for displacement from said channel longitudinally of said second member, and means interengaging said wall means and plate means to restrain displacement of said second member longitudinally within said channel.

16. The joint assembly according to claim 15, wherein said means interengaging said wall means and plate means includes means on said wall means within said channel spaced apart longitudinally of said channel and receiving said opposite sides of said plate means therebetween.

17. A structural joint assembly comprising, a first member including wall means defining a U-shaped channel having a bottom wall, side walls and flange means extending inwardly of the channel from said side walls, a second member having end means and a longitudinal axis at an angle with respect to the longitudinal axis of said channel, said end means including plate means in said channel and having opposite sides in the direction of said channel axis, means on said plate means underlying each of said flange means to restrain displacement of said end means from said channel longitudinally of said second member, means interengaging said wall means and plate means to restrain displacement of said second member longitudinally within said channel, said plate means having side edges facing a corresponding one of said side walls of said first member, said means underlying said flange means including a pair of fingers each mounted on said plate means for pivotal movement laterally of a corresponding one of said side edges, and spring means biasing said fingers laterally outwardly of the corresponding edge.

18. The joint assembly according to claim 17, wherein said fingers have lateral outer edges, and said means interengaging said wall means and plate means includes longitudinally spaced apart means on each of said side walls of said first member receiving said lateral outer edges on said fingers therebetween.

19. The joint assembly according to claim 17, wherein said second member includes a bottom wall and side walls extending along the side edges thereof, said bottom and side walls of said second member having corresponding end edges facing said channel, said plate means including a plate component having a portion in said channel and a mounting portion overlying said bottom wall of said second member, and means interconnecting said second portion with said bottom wall of said second member for said plate component to be slideable longitudinally of said second member.

20. A structural joint assembly comprising, a first member including wall means defining a U-shaped channel having a bottom wall, side walls and flange means extending inwardly of the channel from said side walls, a second member having end means and a longitudinal axis at an angle with respect to the longitudinal axis of said channel, said end means including plate means in said channel and having opposite sides in the direction of said channel axis, means on said plate means underlying each of said flange means to restrain displacement of said end means from said channel longitudinally of said second member, said end means of said second member including second plate means, said second plate means having wall means parallel to each of said side walls of said first member, each said wall means having an edge facing the corresponding flange means on said side walls, each said flange means having an opening therethrough, and each said wall means having a projection thereon extending from said edge through said opening, said projections and openings interengaging to restrain displacement of said second member longitudinally within said channel.

21. The joint assembly according to claim 20, wherein said second plate means is slideable longitudinally of said second member, and means slideably interconnecting said second plate means with said second member.

22. A structural joint assembly comprising, a first member including wall means defining a U-shaped channel having a bottom wall, side walls and flange means extending inwardly of the channel from said side walls, a second member having end means and a longitudinal axis at an angle with respect to the longitudinal axis of said channel, said end means including plate means in said channel and having opposite sides in the direction of said channel axis, means on said plate means underlying each of said flange means to restrain displacement of said end means from said channel longitudinally of said second member, said second member having a bottom wall and side walls extending along the side edges thereof, said edges thereof, said walls of said second member having end edges facing said channel, said plate means including first and second plate components, means interconnecting said plate components with said bottom wall of said second member for said plate components to be slidable relative to said second member longitudinally thereof, said first plate component extending into said channel and including said means underlying said flange means, said second plate component including wall means overlying said flange means, said flange means having openings therethrough, and said wall means having projections thereon received in said openings and interengaging therewith to restrain displacement of said second member longitudinally of said channel.

23. The joint assembly according to claim 22, wherein said first plate component has side edges notched to receive said flange means, said notches having edges beneath said flange means and defining said means underlying said flange means.

24. The joint assembly according to claim 23, and opposed pairs of resilient tabs on each of said sidewalls of said first member receiving said side edges of said first plate component therebetween to restrain displacement of said second member longitudinally of said channel.

* * * * *